United States Patent Office 2,773,890
Patented Dec. 11, 1956

2,773,890

CATALYTIC CARBON MONOXIDE HYDROGENATION WITH AN INCREASED YIELD OF HIGHER BOILING ESTERS

Walter Rottig, Oberhausen-Sterkrade-Nord, Germany, assignor to Ruhrchemie Aktiengesellschaft, Oberhausen-Holten, Germany, and Lurgi Gesellschaft fuer Waermetechnik m. b. H., Frankfurt am Main Heddernheim, Germany No Drawing. Application April 2, 1952,
Serial No. 280,171

Claims priority, application Germany April 11, 1951

9 Claims. (Cl. 260—449.6)

This invention relates to improvements in catalytic carbon monoxide hydrogenation with an increased yield of higher boiling esters. It more particularly relates to the use of special precipitated iron catalysts with a high copper content in the production of oxygen-containing compounds with an increased yield of the higher boiling esters.

Several processes are known for the catalytic hydrogenation of carbon monoxide with the production of synthesis products containing a high yield of oxygen-containing products and especially alcohols. In some such processes melted catalysts of the type used for ammonia synthesis have been used. These catalysts consist essentially of iron with the addition of small amounts of aluminum oxide, silicic acid and alkali.

In another process described for the catalytic hydrogenation of carbon monoxide with the production of high yields of oxygen-containing compounds, special precipitated catalysts are used. These catalysts consist of iron with small amounts of activators such as copper, calcium, cerium, vanadium, and alkali, and, if necessary or desired, more or less large amounts of carrier materials, such as kieselguhr, bleaching earth, etc. With the use of these catalysts, yields of 50% of oxygenated compounds calculated on the liquid primary products were obtained. However, these oxygenated compounds so obtained only contained relatively small quantities of esters, which would seldom exceed about 10% of the total oxygenated compounds. No catalysts were known prior to the present invention which would, in carbon monoxide hydrogenation, catalyze the formation of esters to any considerable extent.

One object of this invention is the catalytic hydrogenation of carbon monoxide with the production of oxygen-containing products with a high content of esters and especially in the higher boiling ranges.

A further object of this invention is the catalytic hydrogenation of carbon monoxide with the production of oxygen-containing products with a high content of esters and a low methane formation. These, and still further objects, will become apparent from the following description:

It has now been found that oxygen-containing products with a high content of esters in the higher boiling ranges may be obtained by the catalytic hydrogenation of carbon monoxide with the use of precipitated iron catalysts at pressures above 5 atmospheres and at temperatures of 170 to 280° C. if the precipitated catalysts contain a content of free alkali of between 4 and 15%, and preferably between 6 and 12%, calculated as $K_2O$ and based on the total iron present, and at least 30% and preferably between 30 and 100% of copper, also based on the total iron present. These special precipitated catalysts with at least 30% of copper exhibit an extremely high activity which will result in high conversion rates of $CO+H_2$ at relatively low reaction temperatures. As a result of the low operational temperature permitted, the methane formation is very low. This is a considerable advantage as compared with the use of conventionally known catalysts for obtaining high yields of oxygen-containing compounds in which the methane formation is of an order of magnitude of about 12 to 15%. The high copper content, in accordance with the invention, will, in addition to a reduced reaction temperature also permit a decreased reaction time.

The activating agents known for precipitated iron catalysts, such as calcium, cerium, vanadium, may be added to the catalyst in amounts of preferably 1–10%. As to the use of carrier materials, such as kieselguhr, bleaching earth, etc., not more than 20%, preferably not more than 10% of these materials should generally be added.

The performance of the carbon monoxide hydrogenation with the use of the catalysts in accordance with the invention is practicable in both operation with fixed-bed catalysts and operation in the liquid phase. While for fixed-bed catalysts molding of the moist catalyst mass is required before the reduction, this is generally superfluous when working in the liquid phase.

It has been found particularly advantageous in accordance with the invention, to reduce the new catalyst to a free iron content of at least 50% and preferably at least 70% of the total iron content. This high reduction value will cause a corresponding increase in the content of esters in the oxygenated compounds.

The new catalysts in accordance with the invention are produced in the same manner as the known, precipitated catalysts. The starting materials generally consist of the salts of iron and copper, and preferably the nitrates. Precipitation is effected in the known manner from a boiling solution of these two metallic salts with the use of boiling solutions of alkaline reacting compounds, such as ammonia, caustic soda or potassium carbonate, or of the corresponding hydroxides. The pH value obtained upon the completion of the precipitation may range between 7 and 12 and preferably between 7 and 9. Washing of the precipitated catalyst may be total or partial, and depends, among other things, on the alkali compound used for the precipitation. In a partial washing, a residual alkali content of between 4 and 15% and preferably between 6 and 12%, calculated as $K_2O$ and based on the iron present is favorable. When effecting a total washing, the washed precipitated catalyst mass must be subjected to a subsequent alkali impregnation to bring the alkali content within the above-mentioned limitation.

After the impregnation or partial washing, the moist catalyst mass is expediently brought to a water-content of between 55 and 70% and subsequently molded. Molding into grains of a cylindrical shape has proven particularly advantageous. The use of molded catalysts is desirable because it will result in only small amounts of dust. Sieving the molded catalyst mass will produce catalyst grains of a uniform size which, after reduction, will permit trouble-free operation in the synthesis furnace.

The reduction of the molded catalyst grains is effected at temperatures between 200 and 350° C. by the action of reducing gases, and preferably of carbon monoxide, hydrogen or hydrogen-nitrogen mixtures or mixtures of these gases, as, for example, water gas, etc. Temperatures of between 250 and 300° C. for the reduction are particularly advantageous. The portion of the metallic iron in the reduced catalyst should be more than 50% calculated on the total iron.

The reduction may be effected in catalyst layers of approximately 30 cm. It is also possible to use catalyst layers of more than 1 meter up to a maximum of 12 meters, and possibly in the synthesis reactor itself. The gas used for the reduction should be as poor as possible in $H_2O$ and $CO_2$.

After the reduction, the catalysts, in accordance with the invention, may be immediately used for the synthesis. Because of their high activity, they must be very carefully started up. At temperatures of approximately 190° C., conversion rates of approximately 60% $CO+H_2$ will already be obtained. The catalysts exhibit a surprisingly long life.

The gas load of the catalysts in accordance with the invention may be varied within wide limits. While, for example, a gas load of 10 parts by volume of gas per part by volume of catalyst per hour may be used, the load may be increased to 100 times this figure.

The synthesis pressures may be in the range between 5 and 100 atmospheres, but may also be in excess of 100 atmospheres. Pressures between 30 and 50 atmospheres have been found advantageous. Single and multistage operation and gas compositions between 0.5 and 2 parts of $H_2$ for each part of CO are possible. In multi-stage operation it is advantageous to remove carbon dioxide between the individual stages. This may be done in the known manner. Moreover, operation with gas recycling has been found to assure long life preserving of the catalyst.

Since, in accordance with the invention, the reaction temperature is low, and the methane formation is correspondingly low, the most economical utilization of the reaction gas is obtained. The high $CO+H_2$ conversion rate obtained in accordance with the invention further increases the economic advantages obtained thereby and allows the use of a relatively small number of synthesis stages in the multiple-stage operation and under certain circumstances even allows the synthesis to be effected in a single-stage operation with a high CO conversion.

The following examples are given to further illustrate the invention and not to limit the same:

*Example 1*

From a boiling solution of the corresponding nitrates containing 50 parts by weight of Cu for every 50 parts by weight of Fe, the corresponding catalyst was precipitated at a pH value of 7.1, using a boiling solution of caustic soda. Immediately thereafter the catalyst mass was carefully washed and impregnated with potassium carbonate in such a manner that an amount of $K_2CO_3$ calculated as 8% of $K_2O$ of the iron present was uniformly incorporated into the moist catalyst mass. After drying a short time to a water content of approximately 60%, the catalyst mass was molded in an extruding press into small cylinders of 5 mm. length which were dried for 24 hours at a temperature of 105° C. and then sieved by means of a vibrator to uniformly sized grains. The dust formation was approximately 4% of the charge.

The finished catalyst was then reduced in a reduction apparatus for 1 hour at a temperature of 280° C., using a gas mixture consisting of 75% of hydrogen and 25% of nitrogen and a gas velocity of 1.4 meters per second, measured in the cold state. The reduction value of the finished catalyst was approximately 80%, calculated on total iron.

This catalyst was then charged to the synthesis in a double-tube furnace of 4.5 meters in length. The synthesis pressure was 30 atmospheres, the gas load was 100 liters per liter of catalyst per hour. The experimental run was carried out without gas recycling.

Using water gas ($CO:H_2 = 1:1$ to $1:1.2$), a $CO+H_2$ conversion of 66% to 67% corresponding to a CO conversion of 88 to 90% was obtained at a temperature of 195° C. The methane formation was approximately 5–6%, calculated on $CO+H_2$ converted.

Using a gas rich in CO containing 0.82 parts of $H_2$ for each part of CO, a $CO+H_2$ conversion of approximately 69 to 70% corresponding to a CO conversion of 80% was obtained at a temperature of 198° C. The methane formation in this case was approximately 4 to 5%, calculated on $CO+H_2$ converted.

Finally, using a gas rich in hydrogen containing 2 parts of $H_2$ for each part of CO, a $CO+H_2$ conversion of 53% was obtained at a temperature of 195° C. Methane formation was approximately 6 to 6.5%, CO conversion in this case was 93%.

The yield of oxygen-containing compounds including the water-soluble alcohols was 55% when using water gas, 53% when using the gas rich in CO, and 59% when using the gas rich in hydrogen.

The portion of esters, based on total oxygenated products, was approximately 30% in the first case, approximately 40% in the second case, and approximately 22% in the third case.

When the precipitation was carried out at a pH value of 9.1 instead of 7.1, using potassium carbonate as the precipitation alkali and washing thereupon partially to a residual alkali content of approximately 9% calculated as $K_2O$ and based on present iron, the same conversion rates could be obtained at temperatures which, on an average, were approximately 5° C. higher, the yield of oxygenated compounds being somewhat lower.

*Example 2*

Water gas was passed over a catalyst as described in Example 1 and containing 8% of $K_2O$ in the form of potassium carbonate, calculated on Fe. A synthesis pressure of 10 atmospheres and a gas load of 150 normal liters of gas per liter of catalyst per hour were used. A conversion of 60% $CO+H_2$ was obtained at a temperature of 220° C. The resulting liquid product contained 1.7% of aldehydes and ketones and 16.7% of esters in addition to 20.9% of alcohols. The ester content of the individual C fractions, principally in the boiling range above 200° C. and preferably above 250° C., was more than 35%, and in some cases above 45%.

When increasing the synthesis pressure to 30 atmospheres, the same rate of conversion was obtained at a temperature of 201° C. The methane formation in this case was aproximately 4 to 5%. The resulting liquid product contained 1.9% of aldehydes and 28.6% of esters in addition to 15.7% of alcohols.

Moreover, certain amounts of alcohols and esters were contained in the reaction water obtained.

I claim:

1. In a process for the catalytic hydrogenation of carbon monoxide, the improvement which comprises contacting a carbon monoxide hydrogen-containing synthesis gas with a precipitated iron hydrogenation catalyst containing at least 30% copper, based on the total iron present in said catalyst, and a free alkali content of about 4 to 15% calculated as $K_2O$, based on the total iron present in said catalyst, at a pressure of at least 5 atmospheres and temperatures of 170 to 280° C., and recovering oxygen-containing products having a high content of esters.

2. Improvement according to claim 1, in which said catalyst contains about 30 to 100% copper, based on the total iron present.

3. Improvement according to claim 1, in which said catalyst has a free alkali content of about 6 to 12% calculated as $K_2O$ and based on the total iron present.

4. Improvement according to claim 1, in which said contacting is effected at a pressure of at least 10 atmospheres.

5. Improvement according to claim 1, in which said iron catalyst is reduced prior to said contacting to a free iron content of at least 50%.

6. Improvement according to claim 5, in which said reduction is effected to free iron content of at least 60%.

7. A catalyst for the catalytic hydrogenation of carbon monoxide with the production of oxygen-containing products having a high content of esters comprising a precipitated iron catalyst having a major portion of iron, a free alkali content of between 4 and 15% calculated as $K_2O$, based on the total iron present in said catalyst, and a copper content of at least 30%, based on the total iron present in said catalyst.

8. A catalyst according to claim 7, in which said copper content is between 30 and 100%.

9. A catalyst according to claim 8, in which free alkali content is between 6 and 12% calculated as $K_2O$ and based on the total iron present.

References Cited in the file of this patent

UNITED STATES PATENTS

| | | |
|---|---|---|
| 1,917,323 | Pier et al. | July 11, 1933 |
| 1,996,101 | Dreyfus | Apr. 2, 1935 |
| 2,234,246 | Groombridge | Mar. 11, 1941 |
| 2,417,164 | Huber | Mar. 11, 1947 |
| 2,457,204 | Brooks | Dec. 28, 1948 |
| 2,457,719 | Pine et al. | Dec. 28, 1948 |
| 2,537,178 | Worsham | Jan. 9, 1951 |
| 2,567,296 | Milligan et al. | Sept. 11, 1951 |
| 2,579,663 | Gilbert et al. | Dec. 25, 1951 |
| 2,598,647 | McGrath | May 27, 1952 |
| 2,617,774 | Rottig et al. | Nov. 11, 1952 |
| 2,620,347 | Rottig | Dec. 2, 1952 |

FOREIGN PATENTS

| | | |
|---|---|---|
| 496,323 | Belgium | Dec. 13, 1950 |
| 502,024 | Belgium | Sept. 20, 1951 |